Dec. 10, 1968  P. M. THAYER  3,415,381
SEWAGE TREATMENT PLANTS

Filed Dec. 29, 1967  3 Sheets-Sheet 1

INVENTOR
PAUL M. THAYER

BY
*Morella & Morell*
ATTORNEYS

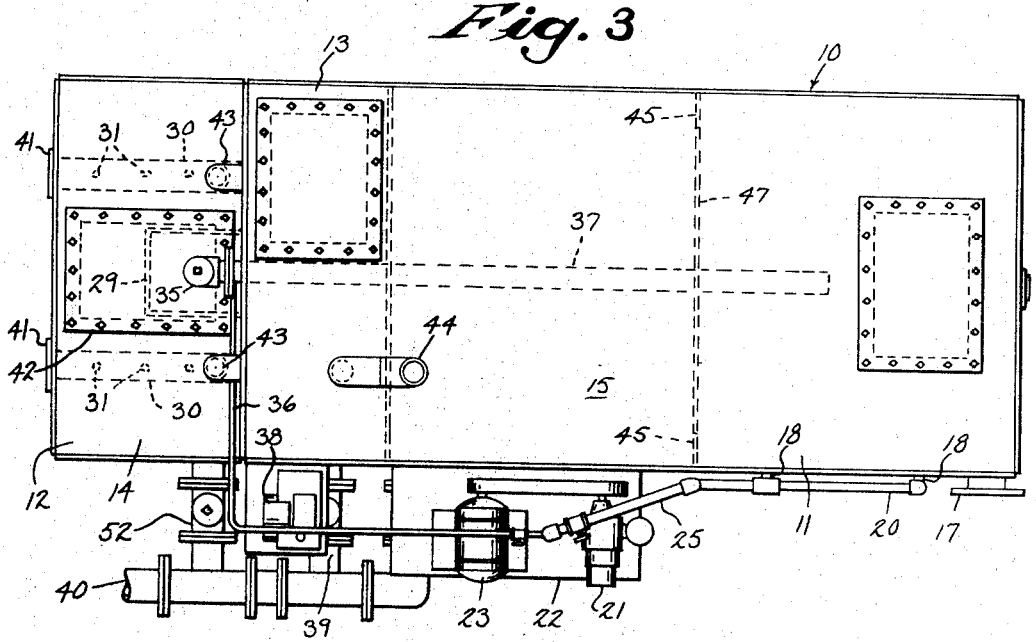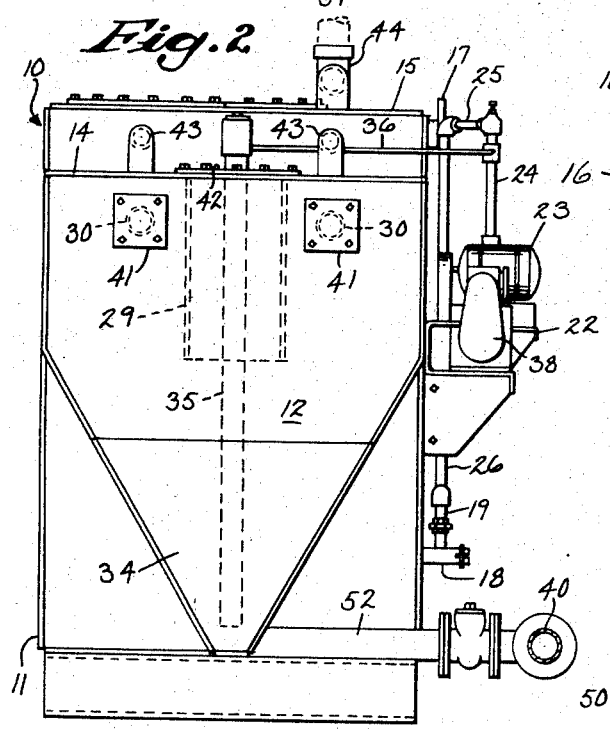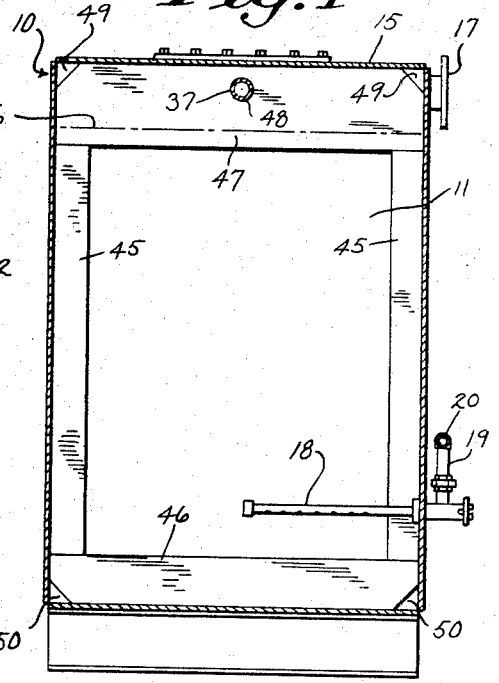

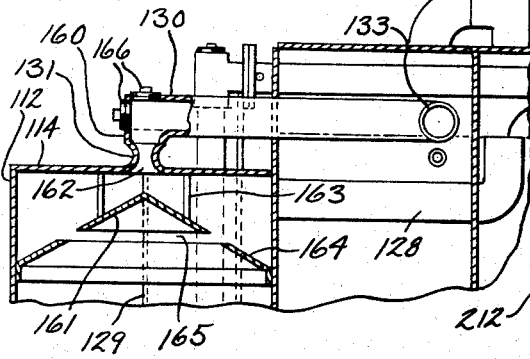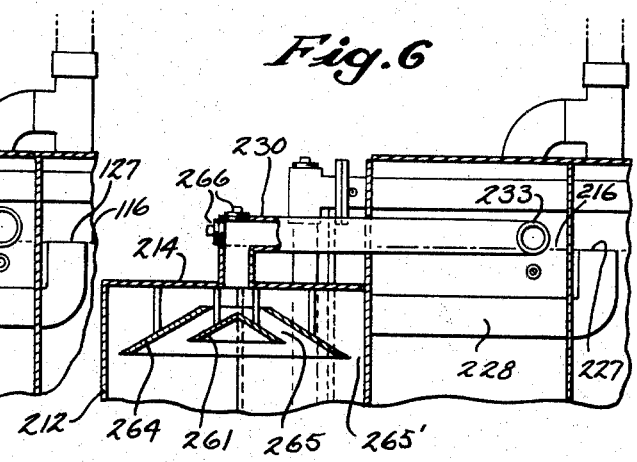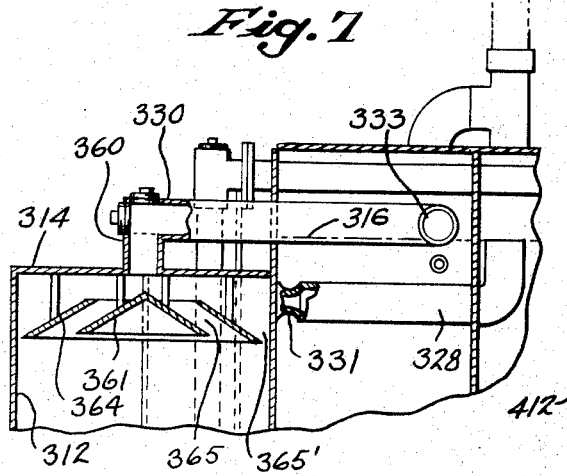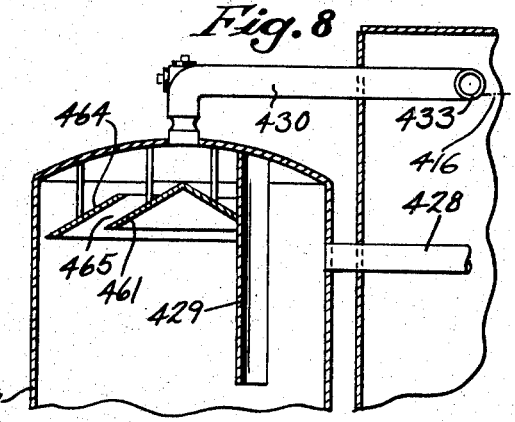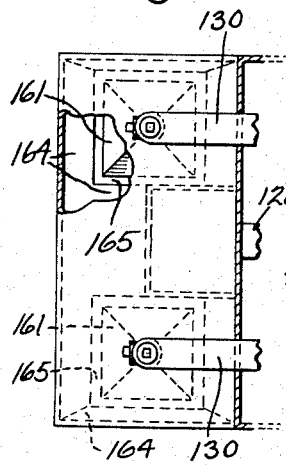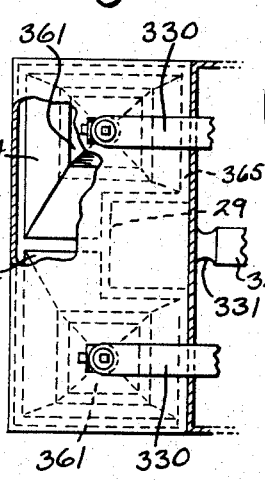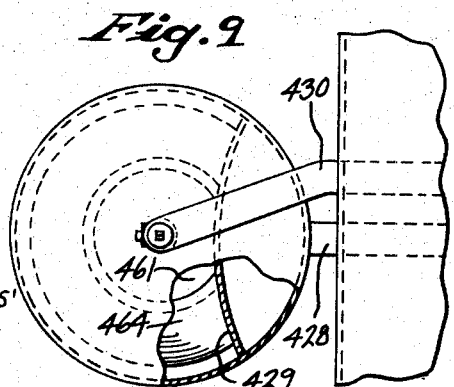
INVENTOR
PAUL M. THAYER
BY Morsell & Morsell
ATTORNEYS United States Patent Office 3,415,381
Patented Dec. 10, 1968

3,415,381
SEWAGE TREATMENT PLANTS
Paul M. Thayer, 3933 N. Prospect Ave.,
Milwaukee, Wis. 53211
Continuation-in-part of application Ser. No. 557,117,
June 13, 1966. This application Dec. 29, 1967, Ser.
No. 701,521
19 Claims. (Cl. 210—202)

ABSTRACT OF THE DISCLOSURE

A sewage plant having an aeration tank, a settling tank, and a holding tank, a withdrawal pipe leading from the aeration tank to the settling tank, there being effluent removal means communicating with the liquid in the settling tank and there being means providing for a restricted rate of discharge from the settling tank when displacement occurs as a result of inflow of mixed liquor from the aeration tank, said effluent removal means having a discharge opening in the holding tank, the settling tank having a roof which is no higher than the lowermost portion of the discharge opening of the effluent removal means so that the settling tank is maintained full to the roof.

---

This is a continuation-in-part of copending application Ser. No. 557,117, filed June 13, 1966 and now abandoned.

In the use of sewage treatment plants on ships there is the problem of the effect on the sewage plant of the pitching and rolling of the ship. In a stationary sewage treatment plant for use on land the liquid level stays undisturbed by outside influences. The pitching of a ship from end to end is inclined to create a wave action with resulting splashing in the tanks. The side-to-side rolling of a ship often involves a sidewise inclination of as much as 25 degrees to each side with but a 25 second interval in a complete rolling cycle. This pitching and rolling action causes a surging or splashing action in the sewage treatment plant which interferes with proper operation thereof, and particularly with the required settling action in the settling tank.

It is a general object of the present invention to provide an improved marine sewage treatment plant which eliminates splashing or surging in the settling tank.

A more specific object of the invention is to provide in a marine "extended aeration process" sewage treatment plant, means for maintaining a liquid level in the settling tank which is against the bottom of the settling tank roof so that there is no room for splashing.

A further object of the invention is to provide in a marine sewage treatment plant of the type described, means providing a restricted rate of removal of effluent from the settling tank to the holding tank in a manner to prevent surging of liquid in the settling tank and to maintain the setting tank completely filled to its roof, to eliminate splashing.

Other objects of the invention are to provide an improved marine sewage treatment plant in which the point of withdrawal of liquid from the aeration tank is at an end of the latter tank which is near the holding tank so that it is relatively close to the point of discharge of effluent from the settling tank into the holding tank, thereby reducing the hydraulic differential between these two points to a minimum; to provide an effluent removal means having a portion in the settling tank which is submerged below the roof line and provided with laterally-spaced holes which are so distributed as to distribute the points of removal throughout the length of the settling tank and thereby provide for an even discharge; and to provide baffle means in the aeration tank to minimize endwise splash.

With the above and other objects in view, the invention consists of the improved sewage treatment plant, and all of its parts and combinations, as set forth in the claims, and all equivalents thereof.

In the accompanying drawings, illustrating one complete embodiment of the preferred form of the invention, in which the same reference numerals designate the same parts in all of the views:

FIG. 2 is an end view thereof looking at the settling tank end;

FIG. 3 is a top view;

FIG. 4 is a sectional view taken on the line 4—4 of FIG. 1;

FIG. 5 is a fragmentary vertical sectional view showing the upper portion of the settling tank, the upper portion of the holding tank, and an upper portion of the aeration tank, the view illustrating a modification;

FIG. 6 is a view similar to FIG. 5 showing an additional modification;

FIG. 7 is a view similar to FIG. 5 showing still another modification;

FIG. 8 is a view similar to FIG. 5 showing still another modification;

FIG. 9 is a top plan view of the form of the invention of FIG. 8;

FIG. 10 is a fragmentary top plan view, on a smaller scale, of the settling tank portion of FIG. 5; and FIG. 11 is a similar fragmentary top plan view of the settling tank portion of FIG. 7.

Figure 1:
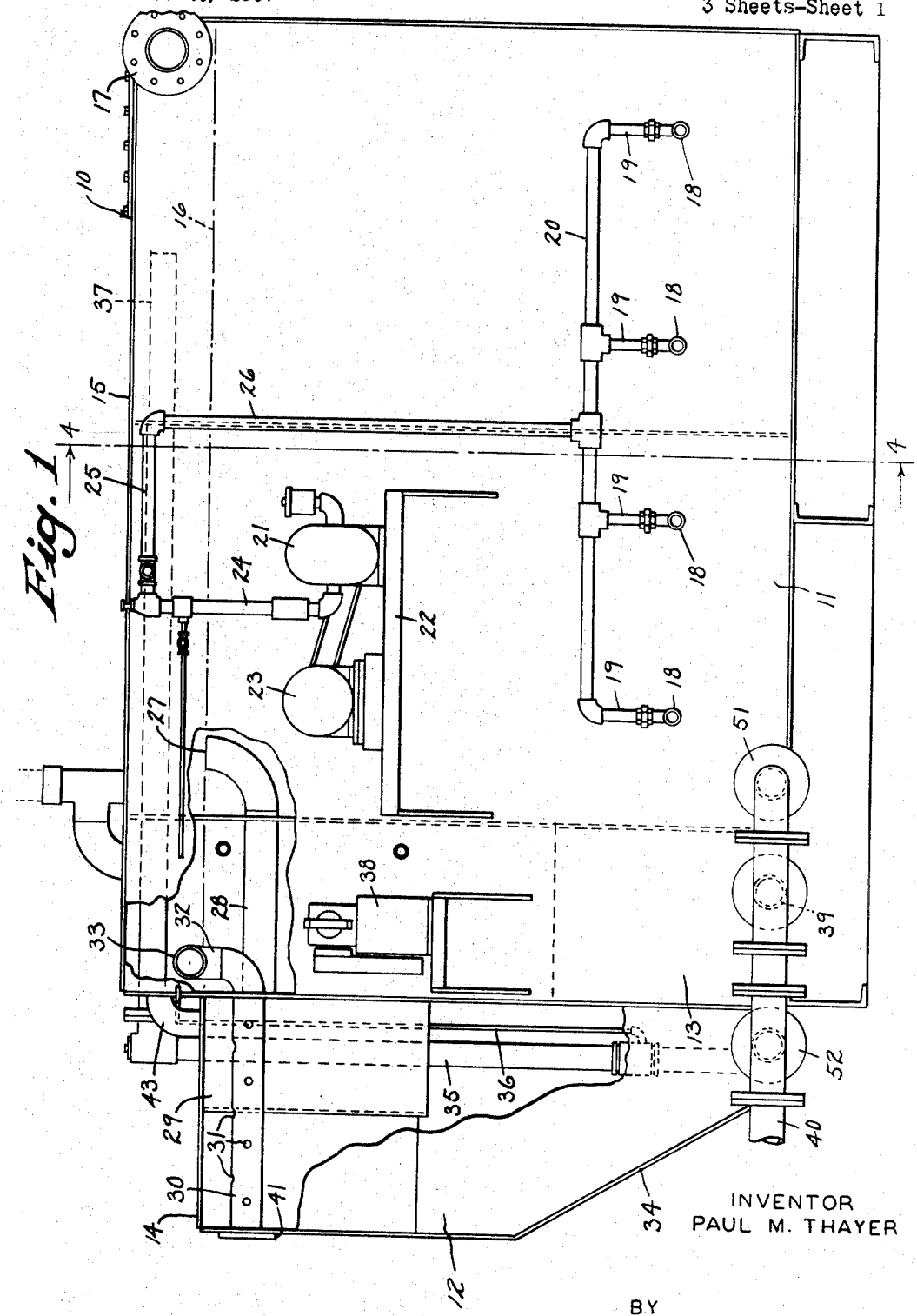
FIG. 1 is a front elevational view of the improved plant, parts being broken away to show the interior.

Referring more particularly to the drawing, the numeral 10 designates generally the improved sewage treatment plant which is designed to carry out the so-called "extended aeration" process of sewage treatment wherein sewage treatment and the aerobic digestion of the solids takes place in the same aeration compartment at the same time. The plant of the present invention is particularly adapted for marine use and is designed to overcome problems which result from the pitching and rolling of a ship. The plant is preferably installed in a ship with its longitudinal axis extending longitudinally of the ship. The plant includes an elongated aeration tank portion 11, a settling tank portion 12 and a chlorination and holding tank portion 13 interposed therebetween. The roof 14 of the settling tank portion is lower than the roof 15 of the other tank portions and is in substantially the same horizontal plane as the normal liquid level 16 in the aeration tank for a purpose hereinafter to be explained.

Raw sewage is adapted to enter one end of the aeration tank through an inlet 17 after being subjected to the action of a marine type comminutor (not shown). Within the aeration tank are aerating diffusers 18 which receive air from branches 19 leading from an air header 20. A blower 21 which may be suitably supported on a platform 22 on the side of the plant is driven by a motor 23 and is adapted to furnish air to the header 20 through lines 24, 25 and 26. The sewage is adapted to remain in the aeration tank for approximately 24 hours. The sewage is adapted to be withdrawn from the surface of the aeration tank by the act of flowing into the upturned end 27 of a withdrawal pipe 28, the latter extending through the holding tank and discharging into an upper portion of the open-bottomed stilling well 29 in the holding tank. Whenever raw sewage enters the aeration tank, mixed liquor flows by displacement through the withdrawal conduit 28 into the stilling well of the settling tank.

The mixed liquor remains in the settling compartment for approximately four hours. The stilling well reduces turbulence and permits the formation of any scum that might accumulate. The sludge, containing sewage solids and aerobic bacteria, settles out through the bottom of the stilling well into the lower portion of the settling tank, thereby clarifying the treated sewage. The clarified sewage is withdrawn from the settling compartment by specially arranged effluent pipes 30. These effluent pipes have a plurality of horizontally-spaced intake openings 31 in their sides and upper portions into which the clarified sewage enters. These openings are distributed throughout the length of the pipes 30 so as to be generally distributed throughout the minor dimension of the settling tank. The effluent pipe has a discharge portion in the form of an elbow 32 which projects upwardly into the chlorination and holding tank 13. The discharge portion 32 has a vertically-disposed discharge opening 33, the lowermost portion of which is approximately at the liquid level 16 and at the same level as the upper intake end 27 of the withdrawal pipe 28 for the aeration tank. It is to be noted that said intake end 28 is at that end of the aeration tank which is close to the holding tank so that the end 28 is thereby laterally close to the discharge opening 33 of the effluent pipe. This reduces the hydraulic differential to a minimum.

Sludge which settles out into the lower portion of the settling compartment 12, which lower portion is of downwardly tapered hopper shape, as at 34, is returned to the entrance end of the aeration compartment by means of an air lift pipe 35 which receives air from an air line 36 leading from the discharge pipe 24 of the blower. The vertical air lift tube 35 communicates with a horizontal sludge return line 37 which extends longitudinally of the upper portion of the holding and aeration tanks above the liquid level 16.

The clarified sewage passes from the settling tank into the chlorination and holding tank 13 as a result of displacement in response to inflow of mixed liquor from the aeration tank through the pipe 28. The liquid in the chlorination and holding tank is chlorinated in any desired manner by a chlorinator 38. From the holding compartment the clarified and treated liquid is discharged through line 39 from the bottom of the holding tank into a discharge line 40 to be pumped overboard by suitable effluent pumps. These pumps may be automatically controlled to turn on when the level in the holding tank reaches a predetermined level and to turn off at a predetermined low level, at which point the pump for the hypochlorinator 38 may turn on. Any suitable timer may be used to turn off the latter pump. Scum will form in the stilling well 29 and will eventually be returned to the aeration tank 11.

It is an important feature of the present invention that the roof 14 of the settling tank be in substantially the same plane as the liquid level 16 in the aeration tank, and in any event that the lowermost portion of the discharge opening 33 be at least as high as the highest part of the roof. With this arrangement, if the settling tank is kept full at all times, there is no opportunity for splashing as a result of pitching or rolling of the ship. Such splashing or rolling is very detrimental to proper action in the settling tank as it interferes with settling. It is also important to eliminate surge in the settling tank. This is accomplished in the form of invention of FIGS. 1–4, by having the intake pipe portions 30 of the effluent pipes located below the roof 14 of the settling tank and in a fully submerged condition in the liquid. With this arrangement, and by having the intake holes 31 distributed throughout the length of the pipes, there is a restricted rate of discharge to the holding tank through the relatively small holes 31, which discharge, however, is evenly distributed throughout the length of the pipes and throughout the corresponding dimension of the settling tank. By thus restricting the rate of discharge to the settling tank, surging in the settling tank is prevented. The discharge of effluent from the settling tank into the holding tank is a result of displacement when liquid enters from the aeration tank through the pipe 28, and the arrangement and size of the holes 31 is such as to maintain the settling tank full of liquid up to the roof.

The holes 31 in the effluent pipes are located along both sides and along the top. The ends of the effluent pipes are removably held in position by removable caps 41 at each end which are removably bolted to the tank wall. The end caps are suitably fitted with gaskets to prevent leakage. There is also a removable cover plate 42 on top of the settling tank. The arrangement is such that the effluent pipe portions 30 which are in the settling tank may be easily disconnected from the lower ends of the discharge elbows 22 and removed from the end of the settling tank.

The settling tank is vented by two vents 43 leading from the top of the settling tank into the top of the holding compartment 13 as illustrated. Another vent 44 communicates through branches with both the aeration tank and the holding tank.

Intermediate the length of the aeration tank are inwardly projecting baffles 45 (see FIG. 4) which project inwardly from the side walls, 46 which project upwardly from the bottom wall, and 47 which projects downwardly from the top wall. There is an opening 48 in the baffle 47 to allow the sludge return line 37 to pass therethrough. There are also vent openings 49 in the upper corners of the baffle 47 and drain openings 50 at the lower corners of the bottom baffle 46.

Valved connections 51 and 52 leading to the effluent discharge line 40 permit draining of the aeration tank and settling tank.

In the form of the invention of FIG. 5 all of the corresponding parts are designated by the same numerals used in FIG. 1 preceded by the digit "1." These common parts will not be redescribed. In this form of the invention, instead of having the submerged effluent conduit of FIG. 1 there is an external effluent conduit 130 having a discharge opening 133, the lowermost portion of which is located at an elevation at least as high as the highest part of the roof 114 of the settling tank. In this modification it is preferred to have the roof of the settling tank lower than the liquid level 116 in the aeration tank. Here the liquid fills the settling tank and normally enters the fitting 160 which connects the effluent withdrawal pipe 130 with the top of the settling tank, said fitting having a restricted portion 131 communicating with an opening 162 in the roof of the settling tank. This restricted orifice 131 performs the same function as the holes 31 in the form of the invention of FIG. 1, serving to allow only a restricted rate of movement of effluent from the settling tank when displacement occurs as a result of inflow of a mixed liquor through the pipe 128. In the form of the invention of FIG. 5 there is a pipe 130 communicating through the roof on each side of the stilling well 129, as shown in FIG. 10. Below each one of the openings 162 there may be suitable means for distributing the locations from which liquid is withdrawn from the settling tank. This is accomplished in FIG. 1 by spacing the holes 31 throughout the minor dimension of the settling tank and by having holes on both sides as well as on the top of the pipe 30. In the form of the invention of FIG. 5 there is a pyramidal distribution plate 161 suspended by hangers 163. Spaced below the distribution plate 161 is a frusto-pyramidal member 164 which may be suitably supported from the sides of the settling tank. Between these members 161 and 164 is a space 165 through which liquid may circulate. The distributors 161 and 164 may be either circular or rectangular in plan view, the latter shape being illustrated in FIG. 10. In order to provide access for cleaning, there may be readily removable plugs 166 in the fitting 160 of the effluent removal conduit.

In the form of the invention of FIG. 6 all of the members which correspond to similar parts in FIG. 1 are designated by the same numbers preceded by the digit "2." The principal difference between the form of the invention of FIGS. 5 and 6 is that in FIG. 6, instead of having a restriction 131 in the effluent removal pipe, said pipe 230 is of substantially less internal diameter throughout its length. This decreased diameter accomplishes the restriction. In the form of the invention of FIG. 6 the distributor plates 261 and 264 are arranged somewhat differently from the plates of FIG. 5, providing two fluid circulating spaces 265 and 265'. Otherwise, the modification of FIG. 6 is like the modification of FIG. 5, and in plan view FIG. 6 will be similar to what is illustrated in FIG. 11, which, however, is actually a plan view of FIG. 7.

In the form of the invention of FIG. 7 all of the parts which correspond to parts of FIG. 1 have the same reference numerals applied thereto except that they are preceded by the digit "3." Here there is no restriction in the effluent removal pipe. Instead there is a restriction 331 in the inlet pipe 328, thereby restricting the inflow of fluid from the aeration tank into the stilling well. Inasmuch as liquid is discharged from the settling tank only in response to displacement action as liquid enters the settling tank, the restriction of the intake necessarily results in a restriction of the movement of effluent from the settling tank into the line 330. Thus the same purpose is accomplished as in the form of the invention of FIGS. 1, 5 and 6. The distributor plates 364 and 361 function the same as the plates 264 and 261 of FIG. 6. FIG. 11 illustrates a plan view of the structure of FIG. 7. In the modifications of FIGS. 5–11 the use of the vents 43 of FIG. 1 are unnecessary as the pipes 130, 230, 330 and 430 perform this function in addition to their principal functions.

In the modification shown in FIGS. 8 and 9 the same reference numerals are used for corresponding parts as were used in FIG. 1, but they are preceded by the digit "4." In this modification the settling tank is circular, as illustrated in FIG. 9, and the stilling well 429 is located adjacent the holding tank as illustrated. The fluid distributors 461 and 464 function the same as the distributors 261 and 264 illustrated in FIG. 6. In FIG. 8 the restriction is in the fitting leading to the effluent removal pipe 430 just as in the form of the invention of FIG. 5.

In operation, when the sewage treatment plant is installed in a ship, preferably with its longitudinal axis extending longitudinally of the ship, any endwise pitching of the ship will tend to cause a splashing and wave action in the upper portion of the aeration tank. This is minimized by the baffle 47 and by the baffle 46. Undesirable liquid action from side-to-side rolling is minimized by the baffles 45. While it is desirable in the aeration tank to hold down such action to a minimum, the important feature of the present invention is to prevent any such action in the settling tank. This is accomplished by maintaining the settling tank full to the roof 14, as heretofore explained, the roofline, in the form of the invention of FIGS. 1–4, being in substantially the same horizontal plane as the liquid level 16 in the aeration tank and in the modifications of FIGS. 5–9, the roofline being below said plane. Thus there is no space for splashing in the settling tank. It is an important feature of the present invention to maintain the settling tank filled to its roof and to provide a restricted rate of discharge of effluent into the holding tank in response to displacement action when liquid enters the settling tank through the withdrawal line 28 from the aeration tank. By restricting the rate of discharge, either by the arrangement of FIG. 1 or by the arrangements of the modifications (FIGS. 5–9), surging in the settling tank is prevented. In addition, by having the lowermost portion of the discharge opening 33 of the effluent discharge located at the liquid level 16, the level of liquid in the settling tank is maintained up to the roofline.

The lowermost portion of the discharge opening 33 must be no lower than the roof 14. While the level of liquid in the holding tank is shown at the same level as the level 16 in the aeration tank, as a practical matter when the discharge pumps are in operation the liquid level in the holding tank will be much lower than the liquid level 16 in the aeration tank.

It is thus apparent that a very practical sewage treatment plant has been provided for use on ships, which may be operated efficiently in any type of weather.

Various changes and modifications may be made without departing from the spirit of the invention, and all of such changes are contemplated as may come within the scope of the claims.

What I claim is:

1. In a sewage plant having a settling tank with a roof and with an inlet for mixed liquor, a first conduit for delivering mixed liquor to said inlet of the settling tank, a second conduit constituting effluent removal means and including an intake portion communicating with the liquid in the settling tank and having a discharge portion with a discharge opening, the lowermost portion of said discharge opening being located at an elevation at least as high as the highest part of said roof to maintain the settling tank filled to the roof with liquid and thereby prevent splashing, one of said conduits including a flow restricting portion to allow a restricted rate of movement of effluent from the settling tank when displacement occurs as a result of inflow of mixed liquor, said restricted rate of movement eliminating surging.

2. A sewage plant as claimed in claim 1 in which the flow restricting portion is in said second conduit.

3. A sewage plant as claimed in claim 1 in which the flow restricting portion is in said first conduit.

4. A sewage plant as claimed in claim 1 in which the second conduit is external of the settling tank and communicates through the roof with the liquid in the settling tank.

5. A sewage treatment plant as claimed in claim 1 in which there is an aeration tank with a raw sewage inlet, and in which the delivery of mixed liquor to the settling tank is by withdrawal from the aeration tank.

6. A sewage treatment plant as claimed in claim 5 in which the withdrawal of liquid from the aeration tank is through an inlet opening of a withdrawal pipe, which opening is located no higher than the liquid level in the aeration tank, and in which the roof of the settling tank is in a horizontal plane no higher than the liquid level in the aeration tank.

7. A sewage treatment plant as claimed in claim 6 in which there is a holding tank into which the discharge portion of the effluent removal means extends.

8. A sewage treatment plant as claimed in claim 7 in which the settling tank, aeration tank, and holding tank are connected to one another, and in which the holding tank projects upwardly above the roof of the settling tank to accommodate the discharge portion of the effluent removal means.

9. A sewage treatment plant as claimed in claim 7 in which the intake opening of the withdrawal pipe in the aeration tank is located in a portion of the aeration tank which is laterally close to the holding tank so as to be relatively close to the point of discharge of effluent into the holding tank, thereby reducing the hydraulic differential between the location of said intake opening and discharge point to a minimum.

10. A sewage treatment plant as claimed in claim 1 in which there is a holding tank into which the discharge portion of the effluent removal means extends.

11. In a sewage plant having a settling tank with a roof and with an inlet for mixed liquor, means for delivering mixed liquor to said inlet of the settling tank, effluent removal means including an intake portion located in the settling tank so as to be submerged in the liquid therein and having a discharge portion with a discharge opening, the lowermost portion of said opening being located at an elevation at least that of the highest part of said roof to maintain the settling tank filled to the roof with liquor and thereby prevent splashing, said effluent removal means including a flow restricting portion to allow a restricted rate of discharge of effluent from the settling tank when displacement occurs as a result of inflow of mixed liquor, said restricted rate of discharge eliminating surging.

12. A sewage treatment plant as claimed in claim 11 in which there is an aeration tank with a raw sewage inlet, and in which the delivery of mixed liquor to the settling tank is by withdrawal from the aeration tank.

13. A sewage treatment plant as claimed in claim 12 in which the withdrawal of liquid from the aeration tank is through an inlet opening of a withdrawal pipe, which opening is located no higher than the liquid level in the aeration tank, and in which the roof of the settling tank is in a horizontal plane no higher than the liquid level in the aeration tank.

14. A sewage treatment plant as claimed in claim 13 in which there is a holding tank into which the discharge portion of the effluent removal means extends.

15. A sewage treatment plant as claimed in claim 14 in which the settling tank, aeration tank, and holding tank are connected to one another, and in which the holding tank projects upwardly above the roof of the settling tank to accommodate the discharge portion of the effluent removal means.

16. A sewage treatment plant as claimed in claim 14 in which the intake opening of the withdrawal pipe in the aeration tank is located in a portion of the aeration tank which is laterally close to the holding tank so as to be relatively close to the point of discharge of effluent into the holding tank, thereby reducing the hydraulic differential between the location of said intake opening and discharge point to a minimum.

17. A sewage treatment plant as claimed in claim 11 in which there is a holding tank into which the discharge portion of the effluent removal means extends.

18. A sewage treatment plant as claimed in claim 11 in which the intake portion of the effluent removal means has intake openings of a size to allow for a restricted rate of discharge of effluent from the settling tank.

19. A sewage treatment plant as claimed in claim 18 in which there are a plurality of relatively small openings in said intake portion.

References Cited

UNITED STATES PATENTS

| | | | |
|---|---|---|---|
| 2,328,891 | 9/1943 | Cline | 210—221 X |
| 2,347,318 | 4/1944 | Gurney | 210—220 X |
| 2,860,809 | 11/1958 | Perry | 220—22 |
| 3,306,447 | 2/1967 | Medeiros | 210—202 X |
| 3,310,070 | 3/1967 | Black | 220—22 X |

FOREIGN PATENTS

| | | |
|---|---|---|
| 245,946 | 7/1963 | Australia. |
| 105,654 | 4/1917 | Great Britain. |

REUBEN FRIEDMAN, *Primary Examiner.*

J. L. DeCESARE, *Assistant Examiner.*

U.S. Cl. X.R.

210—195, 220